United States Patent
Dotsenko et al.

(10) Patent No.: US 11,527,014 B2
(45) Date of Patent: Dec. 13, 2022

(54) METHODS AND SYSTEMS FOR CALIBRATING SURFACE DATA CAPTURE DEVICES

(71) Applicant: Verizon Patent and Licensing Inc., Basking Ridge, NJ (US)

(72) Inventors: Elena Dotsenko, Princeton, NJ (US); Liang Luo, Harrison, NJ (US); Tom Hsi Hao Shang, Forest Hills, NY (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 17/103,495

(22) Filed: Nov. 24, 2020

(65) Prior Publication Data
US 2022/0164988 A1 May 26, 2022

(51) Int. Cl.
*G06T 7/80* (2017.01)
*G06T 7/55* (2017.01)

(52) U.S. Cl.
CPC .......... *G06T 7/85* (2017.01); *G06T 7/55* (2017.01); *G06T 2207/10028* (2013.01); *G06T 2207/20081* (2013.01)

(58) Field of Classification Search
CPC . G06T 2207/10028; G06T 2207/10004; G06T 2207/10012; G06T 7/80; G06T 7/85; G06T 7/97; G06T 7/70; G06T 7/73; G06T 7/74; G06T 7/75; G06T 7/77; G06T 7/50–596; G06T 2207/20081
See application file for complete search history.

(56) References Cited

U.S. PATENT DOCUMENTS

| | | | |
|---|---|---|---|
| 2013/0321589 A1* | 12/2013 | Kirk | G06T 17/00 348/47 |
| 2017/0161901 A1* | 6/2017 | Cansizoglu | G06T 7/593 |

OTHER PUBLICATIONS

Li, Xiaoyang, "Feature Based Calibration of a Network of Kinect Sensors" (2018). Electronic Thesis and Dissertation Repository. 5180. https://ir.lib.uwo.ca/etd/5180 (Year: 2018).*
Endres, Felix, et al. "An evaluation of the RGB-D SLAM system." 2012 IEEE international conference on robotics and automation. IEEE, 2012. (Year: 2012).*
Afzal, Hassan, et al. "Rgb-d multi-view system calibration for full 3d scene reconstruction." 2014 22nd International Conference on Pattern Recognition. IEEE, 2014. (Year: 2014).*

(Continued)

*Primary Examiner* — Geoffrey E Summers

(57) ABSTRACT

An illustrative scene capture system determines a set of two-dimensional (2D) feature pairs each representing a respective correspondence between particular features depicted in both a first intensity image from a first vantage point and a second intensity image from a second vantage point. Based on the set of 2D feature pairs, the system determines a set of candidate three-dimensional (3D) feature pairs for a first depth image from the first vantage point and a second depth image from the second vantage point. The system selects a subset of selected 3D feature pairs from the set of candidate 3D feature pairs in a manner configured to minimize an error associated with a transformation between the first depth image and the second depth image. Based on the subset of selected 3D feature pairs, the system manages calibration parameters for surface data capture devices that captured the intensity and depth images.

20 Claims, 10 Drawing Sheets

(56) References Cited

OTHER PUBLICATIONS

Chai, Zheng, and Takafumi Matsumaru. "ORB-SHOT SLAM: trajectory correction by 3D loop closing based on bag-of-visual-words (BoVW) model for RGB-D visual SLAM." Journal of Robotics and Mechatronics 29.2 (2017): 365-380. (Year: 2017).*

Liu, Hang, et al. "A novel method for extrinsic calibration of multiple RGB-D cameras using descriptor-based patterns." Sensors 19.2 (2019): 349. (Year: 2019).*

Morell-Gimenez, Vicente, et al. "A comparative study of registration methods for RGB-D video of static scenes." Sensors 14.5 (2014): 8547-8576. (Year: 2014).*

Tombari, Federico, Samuele Salti, and Luigi Di Stefano. "Unique signatures of histograms for local surface description." European conference on computer vision. Springer, Berlin, Heidelberg, 2010. (Year: 2010).*

Munaro, Matteo, Filippo Basso, and Emanuele Menegatti. "OpenPTrack: Open source multi-camera calibration and people tracking for RGB-D camera networks." Robotics and Autonomous Systems 75 (2016): 525-538. (Year: 2016).*

Chen, Chi, et al. "Calibrate multiple consumer RGB-D cameras for low-cost and efficient 3D indoor mapping." Remote Sensing 10.2 (2018): 328. (Year: 2018).*

Lemkens, Wim, et al. "Multi RGB-D camera setup for generating large 3D point clouds." 2013 IEEE/RSJ International Conference on Intelligent Robots and Systems. IEEE, 2013. (Year: 2013).*

Macknojia, Rizwan, et al. "Calibration of a network of kinect sensors for robotic inspection over a large workspace." 2013 IEEE Workshop on Robot Vision (WORV). IEEE, 2013. (Year: 2013).*

Zhang, Zhengyou. "A flexible new technique for camera calibration." IEEE Transactions on pattern analysis and machine intelligence 22.11 (2000): 1330-1334. (Year: 2000).*

\* cited by examiner

METHODS AND SYSTEMS FOR CALIBRATING SURFACE DATA CAPTURE DEVICES

BACKGROUND INFORMATION

Capture devices such as cameras and depth capture devices are used to capture still and/or video images that may be presented to viewers and/or analyzed and processed for various applications. As one example of such an application, three-dimensional (3D) models of objects may be generated based on images captured by capture devices having multiple different vantage points around the objects. As another example, computer vision may be performed to extract information about objects captured in the images and to implement autonomous processes based on this information. These and various other applications of image processing may be used in a variety of entertainment, educational, industrial, agricultural, medical, commercial, robotics, promotional, and/or other contexts and use cases. For instance, extended reality (e.g., virtual reality, augmented reality, etc.) use cases may make use of volumetric models generated based on intensity (e.g., color) and depth images depicting a scene from various vantage points (e.g., various perspectives, various locations, etc.) with respect to the scene.

Proper calibration of capture devices capturing images of a scene may facilitate optimal functionality of these image processing applications whether the capture devices are configured to capture intensity data, depth data, or a combination of these or other types of surface data representative of object surfaces. For example, an accurate capture device calibration may eliminate various types of performance and quality issues that might otherwise arise in applications that employ capture devices that are not well-calibrated.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
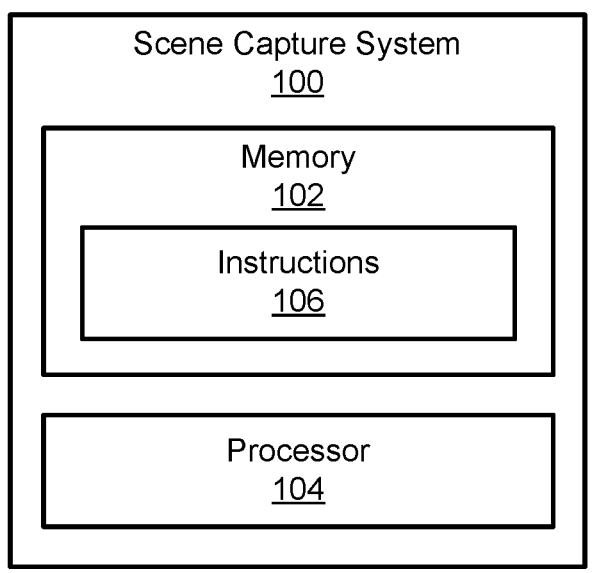
FIG. 1 shows an illustrative scene capture system configured to calibrate surface data capture devices according to embodiments described herein.

Methods and systems for calibrating surface data capture devices are described herein. As used herein, "surface data" may refer to data that is captured, generated, processed, or otherwise created to represent one or more surfaces (e.g., externally visible surfaces) of one or more objects such as real-world objects present at a real-world scene, virtual objects present within a virtual scene or integrated into an augmented real-world scene, or the like. For example, surface data may include intensity data representative of the manner in which light (e.g., including different frequencies of light) reflects from the surfaces of the objects, depth data representative of physical locations and geometries of the objects, metadata that facilitates transmission and/or rendering of the other types of surface data, and/or any other types of data that may serve to represent object surfaces in a particular implementation.

Intensity data may be implemented by color data (e.g., red-green-blue (RGB) data, etc.), grayscale data (e.g., luminance data), or any other suitable data representing one or more objects' appearance in terms of color, texture, and so forth. Intensity data may be captured by capture devices such as still cameras or video cameras, and may be represented using any image data format as may serve a particular implementation.

Depth data may be implemented by grayscale data or other suitable data representing one or more objects' physical locations and/or the geometries of the objects' surfaces with respect to a 3D coordinate space (e.g., with respect to an origin point within the scene, with respect to the location of a depth capture device, etc.). Depth data may be captured by depth capture devices (e.g., time-of-flight depth scanners, structured light depth capture devices, etc.), and may be represented using any image data format as may service a particular implementation. For instance, depth data for a depth image may include respective values corresponding to each pixel of the depth image and representing respective distance from a vantage point of the depth capture device to a surface point on the object (e.g., such that closer surface points appear as lighter shades of gray and farther surface points appear as darker shades of gray, or vice versa).

In certain examples, both intensity data and depth data may be captured from a single vantage point by a surface data capture device. For instance, a surface data capture device may be implemented as a camera and a depth capture device that are configured to interoperate with one another and share a vantage point. In certain implementations, a surface data capture device may include a separate camera and depth capture device that are closely coupled to one another (e.g., located at the same position with respect to the scene) and are pre-calibrated to capture intensity and depth data from essentially the same vantage point. In other implementations, a surface data capture device may include camera and depth capture equipment that is integrated together within a shared housing so as to be able to generate intensity and depth data from a shared vantage point (e.g., the vantage point of the integrated surface data capture device). Intensity data and depth data may be integrated together (e.g., along with metadata and possibly other types of surface data) into what may be referred to herein as a "surface data image" that represents surfaces of one or more objects at a scene in terms of both intensity and depth data from a single vantage point. Such surface data images may be represented using any type of data format as may serve a particular implementation, including, for example, a red-green-blue-depth (RGBD) data format.

Methods and systems described herein are configured to calibrate surface data capture devices (e.g., surface data capture devices implemented by separate intensity and depth capture devices, integrated intensity/depth capture devices, etc.) that are located at different vantage points with respect to a scene. Accurate calibration (and the accurate 3D point cloud generation resulting therefrom) of multiple surface data capture devices may benefit from a careful and deliberate selection of feature pairs (e.g., corresponding points in different images captured from different vantage points). Unfortunately, calibration of surface data capture devices has conventionally been challenging because of the difficulty of aligning the 3D representations captured by the capture devices to allow feature pairs to be identified from a single unified model of the scene. Successful alignment of surface data images captured from different vantage points may facilitate an accurate calibration of the capture devices, but conventional techniques for identifying correspondences needed by alignment algorithms (e.g., 3D features common to multiple 3D representations of the scene captured from different vantage points) have been highly prone to error and inefficiency.

To address these challenges, methods and systems for calibrating surface data capture devices described herein may identify feature pairs in a manner that leverages a combination of two types reliably determinable image transformations in order to identify a transformation that is more challenging to reliably determine. Specifically, as will be described in more detail below, respective transformations from 3D depth data to two-dimensional (2D) intensity data for individual first and second vantage points, as well as a 2D transformation of 2D intensity data captured at the first vantage point to 2D intensity data captured at the second vantage point (each of which may be reliably determinable), may be combined to facilitate the challenge of determining a 3D transformation of 3D depth data captured from the first vantage point to 3D depth data captured from the second vantage point. This 3D transformation may allow 3D representations captured from both first and second vantage points to be aligned such that accurate calibration parameters for the capture devices at the first and second vantage points may be accurately generated, adjusted, and/or otherwise managed.

Methods and systems for calibrating surface data capture devices described herein provide various significant technical benefits such as an increase in the accuracy, efficiency, and/or stability of the calibration process. Additionally, along with improving calibration of the capture devices, alignment of multiple 3D representations (e.g., surface data images) using techniques described herein may facilitate follow-on processes performed by scene capture systems. For instance, the alignment of multiple surface data images performed for calibration purposes may also facilitate efficient generation of volumetric models of objects at the scene, since these volumetric models may also require images from multiple vantage-points to be aligned (as may have been performed already as part of the calibration process). 3D correspondences (e.g., corresponding 3D features represented by multiple surface data images) selected during the calibration process may also serve as a reliable anchor for alignment and provide accurate error measurement to approximated transformations between capture devices. In this way, inefficient and slow iterative processes for finding best-fitting poses of objects being modeled may be avoided and/or improved as 3D representations are merged, and a more accurate and rapid image alignment can be achieved.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein for calibrating surface data capture devices may provide any of the benefits mentioned above, as well as various additional and/or alternative benefits that will be described and/or made apparent below.

FIG. 1 shows an illustrative scene capture system 100 ("system 100") configured to calibrate surface data capture devices in accordance with principles described herein. System 100 may be implemented by computer resources such as server systems or other computing devices that include processors, memory facilities, storage facilities, communication interfaces, and so forth. For example, system 100 may be implemented by computing systems such as local computing systems operated by a user, distributed computing systems operated by a communications provider (e.g., multi-access edge computing (MEC) servers), distributed computing systems operated by a cloud-computing provider (e.g., multi-access cloud servers), and/or any other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with calibrating surface data capture devices as described herein and/or as may serve a particular implementation.

Figure 2:
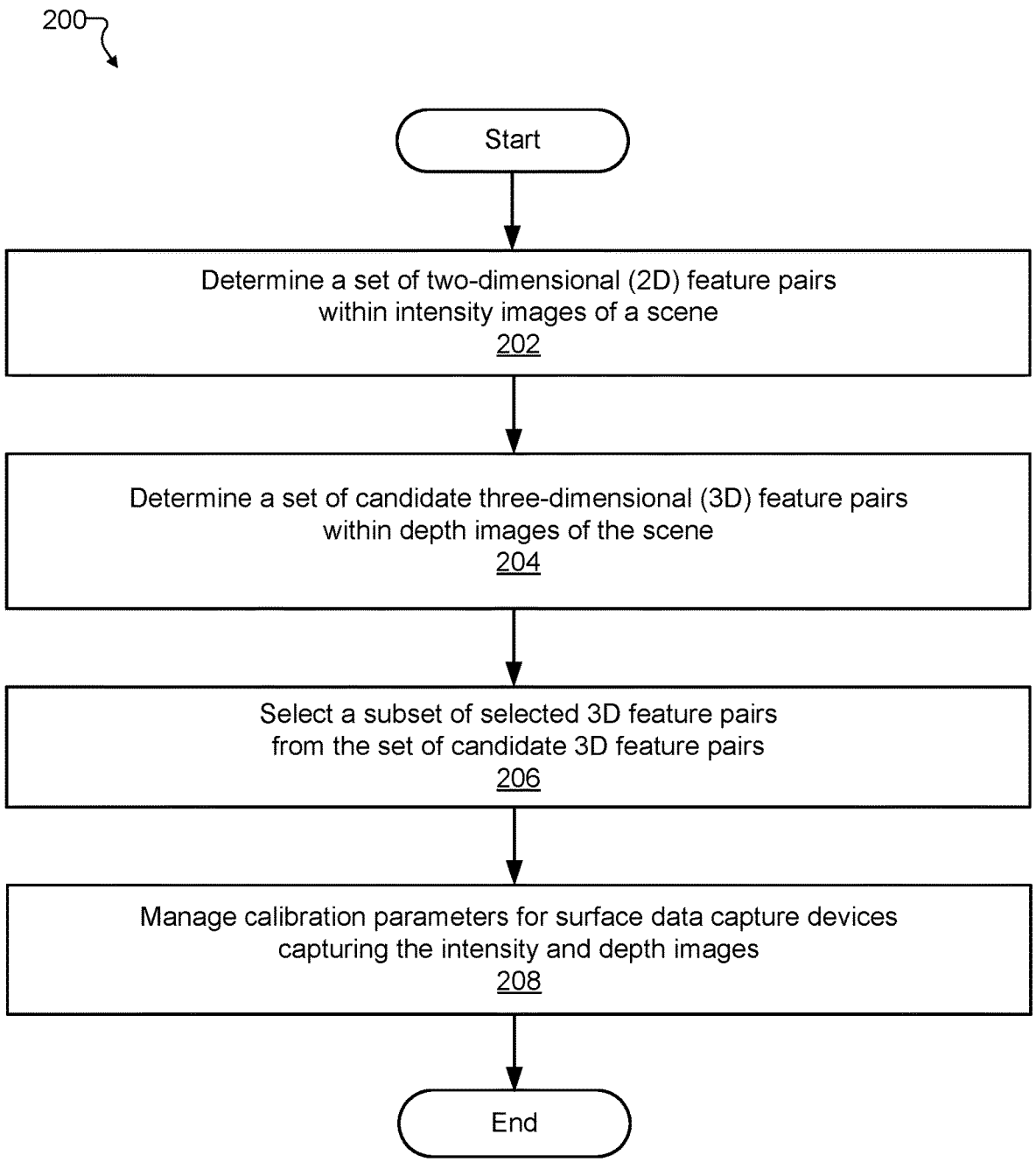
FIG. 2 shows an illustrative method for calibrating surface data capture devices according to embodiments described herein.

As one example of functionality that processor 104 may perform, FIG. 2 shows an illustrative method 200 for calibrating surface data capture devices in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a scene capture system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may determine a set of 2D feature pairs. For example, each 2D feature pair in the set determined by system 100 at operation 202 may represent a respective correspondence between a particular feature depicted in a first intensity image depicting a scene from a first vantage point and a corresponding feature depicted in a second intensity image depicting the scene from a second vantage point. As will be described in more detail below, identifying 2D feature pairs depicted in intensity images captured from different vantage points may be performed using any of various reliable techniques that have been developed and established for tasks such as stitching 2D panoramic images based on multiple 2D images or other such tasks. In some examples, the determining of the set of 2D feature pairs at operation 202 may be performed using relatively low or permissive confidence thresholds so as to generate a relatively large number of 2D feature pairs. For example, at this stage in the process, it may be preferable to generate a larger number of lower-confidence 2D feature pairs than a smaller number of higher confidence 2D feature pairs. Various details and algorithms associated with determining sets of 2D feature pairs will be described and illustrated below.

At operation 204, system 100 may determine a set of candidate 3D feature pairs. For example, the candidate 3D feature pairs may be selected based on the set of 2D feature pairs determined at operation 202. The set of candidate 3D feature pairs determined at operation 204 may represent at least some of the respective correspondences of the set of 2D feature pairs, but within depth images of the scene instead of intensity images of the scene. For example, each candidate 3D feature pair may correspond to one of the 2D feature pairs that has been determined, but may refer to corresponding features included within a first depth image depicting the scene from the first vantage point (e.g., a first depth image corresponding to the first intensity image) and a second depth image depicting the scene from the second vantage point (e.g., a second depth image corresponding to the second intensity image). The 2D feature pairs of the set determined at operation 202 may be converted (e.g., transformed) into the candidate 3D feature pairs of the set determined at operation 204 based on a known relationship (e.g., transformation) between the first intensity image and the first depth image, both of which may have been captured by a surface data capture device from the same vantage point. Various additional details associated with determining sets of candidate 3D feature pairs will be described and illustrated below.

At operation 206, system may select a subset of selected 3D feature pairs from the set of candidate 3D feature pairs determined at operation 204. The selected 3D feature pairs of the subset may number significantly less than the number of 2D feature pairs originally determined for the set of operation 202, as well as the number of candidate 3D feature pairs determined for the set of operation 204. For example, the subset of selected 3D feature pairs may be selected to minimize an error (e.g., as represented by an error metric) associated with a transformation between the first depth image and the second depth image, such that only relatively high confidence 3D feature pairs (e.g., 3D feature pairs associated with relatively low error metrics) are included in the subset. In contrast to the stage described above in which it is preferable for the set of 2D feature pairs to include a relatively large number of 2D feature pairs with permissive confidence levels, at this stage, it may be preferable for the subset of selected 3D feature pairs to include a relatively small number of 3D feature pairs that all are characterized by relatively high confidence levels. In this way, alignment between each of the surface data images may be accurately and efficiently achieved to allow for optimal calibration operations, volumetric modeling operations, and other operations that are to be performed by system 100 as described herein.

At operation 208, system 100 may manage calibration parameters for one or more of the surface data capture devices that captured the surface data images referred to above. For example, based on the subset of selected 3D feature pairs selected at operation 206, system 100 may manage calibration parameters for a first surface data capture device that captured the first intensity and depth images from the first vantage point, a second surface data capture device that captured the second intensity and depth images from the second vantage point, and/or any other surface data capture device as may be relevant to a particular implementation. The more accurately surface data images can be aligned (e.g., both in terms of 2D intensity data and 3D depth data), the more accurately calibration parameters may be defined and the lower the margin of error may be for data representations generated based on the calibrated capture devices. Accordingly, managing calibration parameters at operation 208 may benefit significantly from being based on only the highest quality 3D feature pairs as selected at operation 206 described above.

As will be described in more detail below, managing calibration parameters may involve generating and initializing a new set of calibration parameters (e.g., intrinsic parameters, extrinsic parameters, etc.) when a surface data capture device is first aligned with other devices with respect to a 3D coordinate space. Additionally, in certain examples, managing calibration parameters may involve adjusting previously initialized calibration parameters based on dynamic changes to the properties of the scene or the surface data capture device (e.g., when a surface data capture device is moved with respect to the other devices so as to require a new alignment, etc.). Additional detail related to managing calibration parameters and other operations that may be performed using the subset of selected 3D feature pairs selected at operation 206 will be described and illustrated below.

Figure 3:
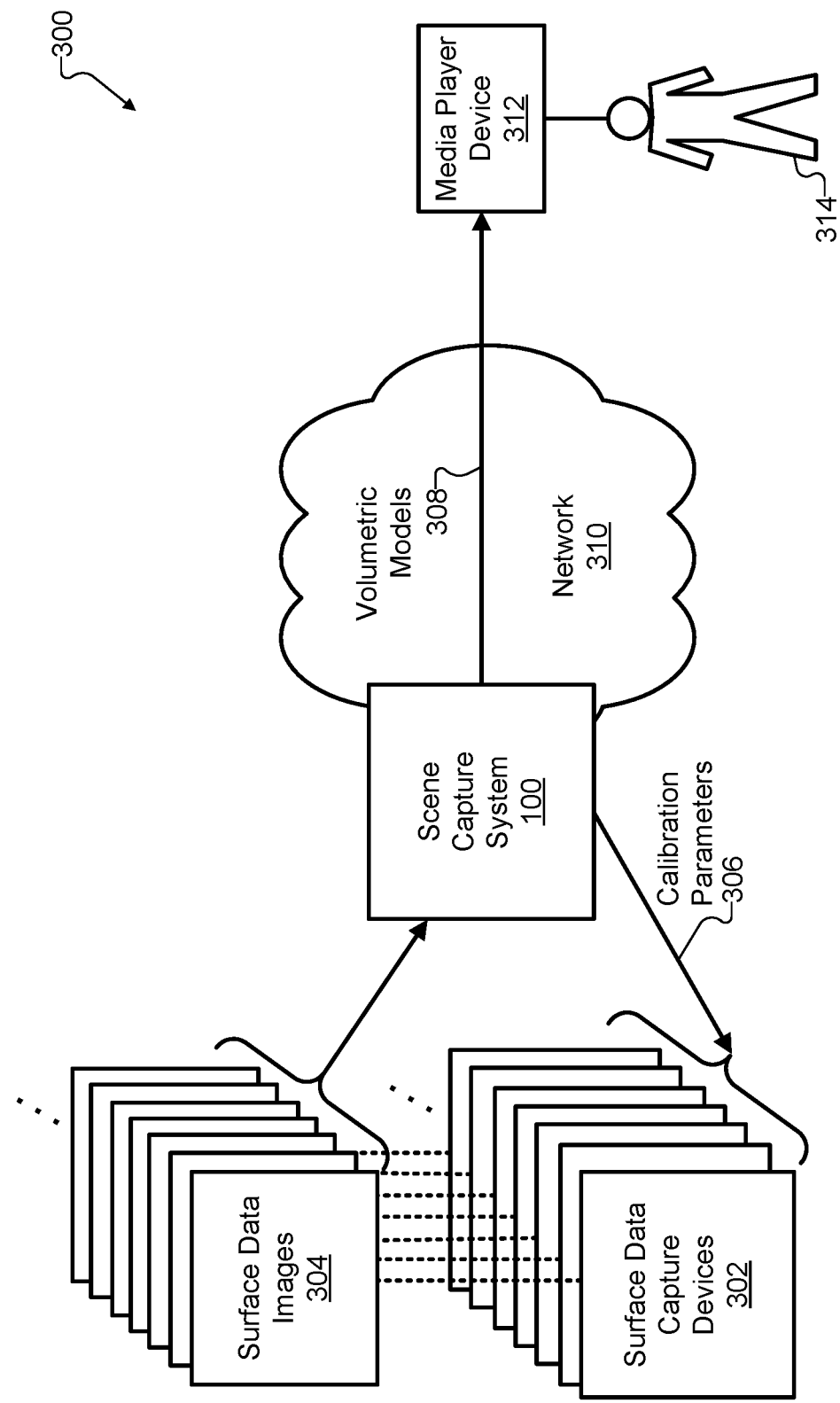
FIG. 3 shows an illustrative configuration within which the scene capture system of FIG. 1 may operate to calibrate surface data capture devices and generate and provide volumetric model data according to embodiments described herein.

FIG. 3 shows an illustrative configuration 300 within which system 100 may operate to calibrate surface data capture devices in accordance with principles described herein, as well as to perform other operations such as generating and providing volumetric model data. As shown, configuration 300 includes a set of surface data capture devices 302 that are communicatively coupled to system 100 and that generate and provide surface data images 304 that are used by system 100 to manage (e.g., generate, adjust, etc.) respective calibration parameters 306 for surface data capture devices 302. While surface data capture devices 302 are illustrated as being external to system 100 in configuration 300, it will be understood that, in certain implementations, surface data capture devices 302 and/or other elements configured to facilitate image capture may be integrated with system 100 such that system 100 may obtain or access surface data images 304 by generating the images, rather than by receiving or obtaining the data from external data sources as shown in configuration 300.

Configuration 300 further shows that system 100 may provide data representative of one or more volumetric models 308 by way of a network 310 to a media player device 312 associated with a user 314. For example, as will be described in more detail below, volumetric models 308 may be generated by system 100 based on surface data images 304, calibration parameters 306, and/or other suitable data using methods and systems for volumetric modeling described herein. Each of the elements of configuration 300 will now be described in more detail with reference to FIGS. 3 and 4.

Figure 4:
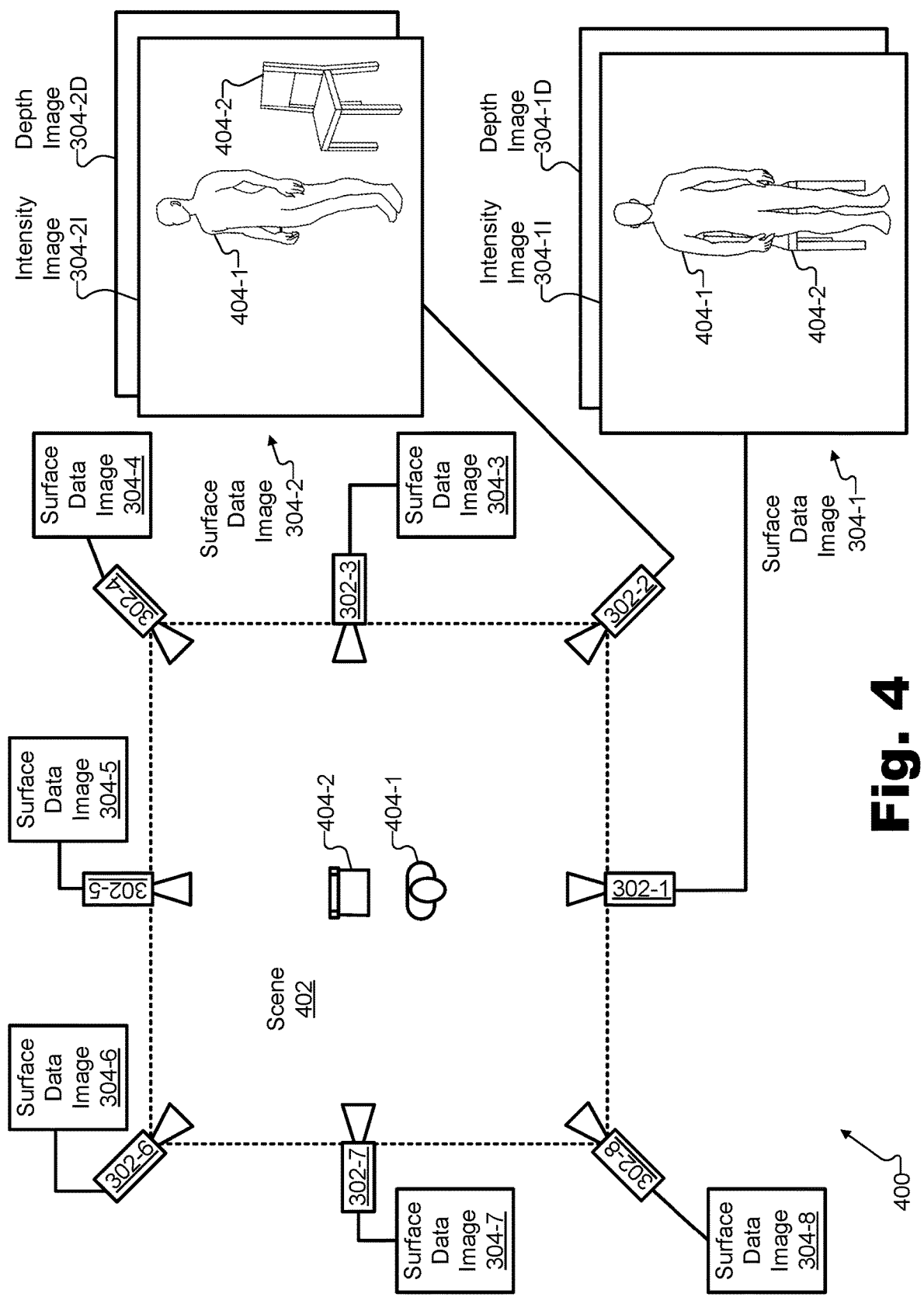
FIG. 4 shows an illustrative configuration in which surface data capture devices may be arranged to capture surface data images depicting objects in a scene from different vantage points according to embodiments described herein.

Surface data capture devices 302 may capture and provide surface data images 304 to system 100 in any suitable way. For example, FIG. 4 shows an illustrative configuration 400 in which surface data capture devices 302 may be arranged to capture surface data images 304 depicting objects in a scene from different vantage points in accordance with principles described herein. As shown in FIG. 4, configuration 400 includes a scene 402 (e.g., a square-shaped real-world scene outlined by a dotted line in this example) around which a set of surface data capture devices 302 (e.g., surface data capture devices 302-1 through 302-8) are arranged so as to have different vantage points of scene 402. Present within scene 402, configuration 400 shows two objects 404. Specifically, a first object 404-1 is shown, in this example, to be implemented as a human body object (also referred to herein as human body object 404-1), while a second object 404-2 is shown, in this example, to be implemented as an inanimate furniture object such as a chair object (also referred to herein as furniture object 404-2).

Each of surface data capture devices 302 in configuration 400 may be configured to synchronously capture respective surface data images 304 to be provided to system 100 in any suitable way (e.g., by way of an image capture system not explicitly shown in FIG. 4 that manages synchronous capture and transmission of surface data images 304). As shown, surface data image 304-1 may be captured by surface data capture device 302-1 to depict objects 404 from the vantage point of surface data capture device 302-1, surface data image 304-2 may be captured by surface data capture device 302-2 to depict objects 404 from the vantage point of surface data capture device 302-2 (which, as shown, is different from the vantage point of surface data capture device 302-1), and so forth. In FIG. 4, illustrative depictions of objects 404 are shown for surface data images 304-1 and 304-2, while the other surface data images 304-3 through 304-8 are only labeled with text. It will be understood that each of surface data images 304-3 through 302-8 may likewise include surface data depictions of objects 404 of scene 402 from the respective vantage points of surface data capture devices 302-3 through 302-8, though these images are not explicitly shown in FIG. 4 due to space constraints.

As has been described, and as is explicitly illustrated by surface data images 304-1 and 304-2, each surface data image 304 may include both intensity data and depth data. For example, surface data image 304-1 is shown to include an intensity image 304-1I ("I" for "intensity") as well as a depth image 304-1D ("D" for "depth"). Similarly, surface data image 304-2 is explicitly shown to include an intensity image 304-2I and a depth image 304-2D. While depth images 304-1D and 304-2D are illustrated as being behind respective intensity images 304-1I and 304-2I due to space constraints, it will be understood that the depth images depict objects 404 from the same vantage point as the corresponding intensity images, but, rather than using intensity data (e.g., color RGB data, grayscale luminance data, etc.) to do so, depth images 304-1D and 304-2D depict objects 404 using depth data such as described above (e.g., grayscale values whose shade indicates a depth for each pixel with respect to the vantage point of the surface data capture device capturing the image).

Respective sets of surface data images such as surface data images 304 may be synchronously captured by surface data capture devices 302 at various times so as to continually capture data representing objects 404 as the objects change, move about scene 402, leave scene 402 or are joined by other objects, and so forth. For example, surface data capture devices 302 may be a set of synchronized real-world or virtual capture devices configured to capture scene 402 (and whatever objects may be included therein) several times per second. Respective sets of surface data images (e.g., including the set of surface data images 304, which may all depict scene 402 at a particular moment in time) may be provided to system 100 by way of direct wired or wireless communication and/or by way a network (e.g., network 310) that may implement and/or employ any suitable communication technologies, devices, media, protocols, or the like as may serve a particular implementation.

While objects 404 are depicted, respectively, as a human body object and a furniture object in configuration 400, it will understood that these objects are illustrative only, and that various types of real and/or virtual objects may be included as targets for volumetric modeling in various real-world and/or virtual scenes. For instance, in addition or as an alternative to objects 404, objects representing other people, props, animals, vehicles, inanimate objects, and so forth may be present in a scene such as scene 402.

Scene 402 may be implemented as any type of real-world or virtual scene set indoors or outdoors and having any size or other characteristics as may serve a particular implementation. For instance, in one example, scene 402 may be a real-world studio setting where a single object is included within the scene for the purpose of generating and updating a volumetric model of the object. Conversely, in another example, scene 402 may be a relatively large real-world event venue such as a playing field where a sporting event is taking place or a stage where a concert or other such event is being performed. In these examples, a large number of objects (e.g., a large number of people and/or other suitable subjects) may be captured for volumetrically modeling concurrently. In yet another example, scene 402 may be implemented by a virtual world (e.g., an imaginary world of a video game or virtual reality experience that is generated entirely using computer generated imagery, etc.) that is virtually captured and/or modeled in order to increase the efficiency of encoding, storing, distributing, and/or otherwise managing the scene.

Surface data capture devices 302 may capture surface data (e.g., intensity data, depth data, etc.) and provide the surface data together with other data (e.g., metadata, etc.) as may serve a particular implementation. To this end, surface data capture devices 302 may be implemented in any of the ways described herein. For instance, each surface data capture device 302 may represent a co-located 2D intensity data capture device (e.g., a video camera, etc.) for capturing the respective intensity images and a 3D depth data capture device (e.g., a time-of-flight depth capture device, a stereoscopic depth capture device, a structured light depth capture device, etc.) for capturing the respective depth images. As another example, each surface data capture device 302 may represent an integrated device configured to perform both intensity and depth capture operations and to provide surface data in a suitable format (e.g., an RGBD data format, etc.).

Regardless of how each surface data capture device 302 is implemented, the surface data provided by each surface data capture device 302 may be generated such that the intensity data (e.g., intensity images 304-1I, 304-2I, etc.) is aligned with the depth data (e.g., depth images 304-1D, 304-2D, etc.) so as to facilitate the discovery of feature pairs between corresponding intensity and depth images from each particular vantage point. Specifically, surface data image 304-1 may be generated by surface data capture device 302-1 (and accessed therefrom by system 100) as a first dataset that represents intensity image 304-1I and depth image 304-1D in a manner that aligns each feature of intensity image 304-1I with a corresponding feature of depth image 304-1D. Similarly, surface data image 304-2 may be generated by surface data capture device 302-1 (and accessed therefrom by system 100) as a second dataset that represents intensity image 304-2I and depth image 304-2D in a manner that aligns each feature of intensity image 304-2I with a corresponding feature of depth image 304-2D. As will be described in more detail below, such surface data image datasets (e.g., the first and second datasets or other similar datasets for the other surface data images 304) may be accessed by system 100 and used to determine a set of candidate 3D feature pairs and/or to perform other operations described herein.

Each of surface data capture devices 302 in configuration 400 may be calibrated using intrinsic and/or extrinsic calibration parameters to thereby facilitate optimal functionality of system 100 and/or other systems that are to use surface data captured by surface data capture devices 302, to eliminate performance and quality issues, and so forth. In certain implementations, calibration of surface data capture devices 302 may be performed during a designated time period using dedicated objects (e.g., chessboard objects or objects with other well-defined and recognizable features) that facilitate the calibration. Additionally, methods and systems described herein for calibrating surface data capture devices may support intra-capture calibration of surface data capture devices 302. That is, calibration of surface data capture devices 302 may be performed, in certain examples, during normal operation of system 100 (e.g., while objects 404 of scene 402 are being captured for use in generating volumetric models 308) and with ordinary objects included within the scene (e.g., objects 404 rather than dedicated calibration objects).

Returning to FIG. 3, system 100 is shown to manage, based on surface data images 304, calibration parameters 306 that are used by surface data capture devices 302. Calibration parameters 306 may be determined using operations described above in relation to method 200 of FIG. 2, as well as operations that will be further described in more detail below, and may include any type of calibration parameters (e.g., intrinsic parameters, extrinsic parameters, etc.) as may serve a particular implementation. Calibration parameters 306 will be described in more detail below.

One or more volumetric models 308 may be generated and continuously updated for scene 402 and/or for each object 404 within scene 402. These volumetric models may be generated and updated based on surface data images 304 (e.g., the set of surface data images 304 depicting the moment in time shown in FIG. 4, as well as previous and subsequent sets of surface data images 304 depicting other moments in time as the objects and the scene change), as will be described in more detail below. Volumetric models 308 generated and continuously updated by system 100 may be provided, by way of network 310, to media player device 312 associated with user 314.

Network 310 may include any network elements and/or characteristics as may serve a particular implementation. For example, network 310 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 310 may include elements of various interconnected networks that are outside of any provider network and outside the control of any provider of such a provider network. Elements of the Internet, a wide area network, a content delivery network, and/or any other suitable network or networks are examples of other elements that may be included within network 310. Any of these provider or non-provider networks or network elements may provide data delivery between system 100 and client devices such as media player device 312.

Media player device 312 may be implemented as any type of computing device used by user 314 to experience volumetric models 308 or to otherwise consume content provided by system 100 based on surface data images that are captured by surface data capture devices calibrated by system 100 in accordance with principles described herein. For example, if a volumetric model 308 is to be presented as part of an extended reality experience (e.g., a virtual reality experience, an augmented reality experience, etc.) in which user 314 is engaged, media player device 312 may be implemented as an extended reality device (e.g., a head-mounted device) configured to present the extended reality experience. In the same or other examples, media player device 312 may be implemented as a general-purpose computing device (e.g., a mobile device such as a smartphone or tablet device, a personal computing device such as a laptop computer, etc.). Such a device may present an extended reality experience to user 314 that features volumetric models 308 of objects included in captured scenes (e.g., objects 404 of scene 402). In other examples, media player device 312 may present volumetric or other models in other suitable contexts such as for communications applications (e.g., a 3D video phone), medical applications, agricultural or surveying applications (e.g., drone flyover, etc.), engineering applications (e.g., a 3D computer-aided design application), or any other contexts or use cases as may be described herein or as may serve a particular implementation.

Various types of data provided by system 100 to other systems and devices may be generated by system 100 based on reliable 2D and 3D alignment of surface data images 304. For example, along with a 2D alignment of the various intensity images of scene 402 included within surface data images 304 (e.g., to form a 360° inward-facing panoramic intensity image of scene 402), system 100 may further generate a 3D alignment (e.g., a 3D depth model or other depth representation) of the various depth images of scene 402 included within surface data images 304. Such 2D and 3D alignments may be used for managing calibration parameters 306 for surface data capture devices 302, for generating and updating volumetric models 308 provided to media player device 312, and/or for performing other operations that system 100 may be configured to perform in particular implementations.

Figure 5:
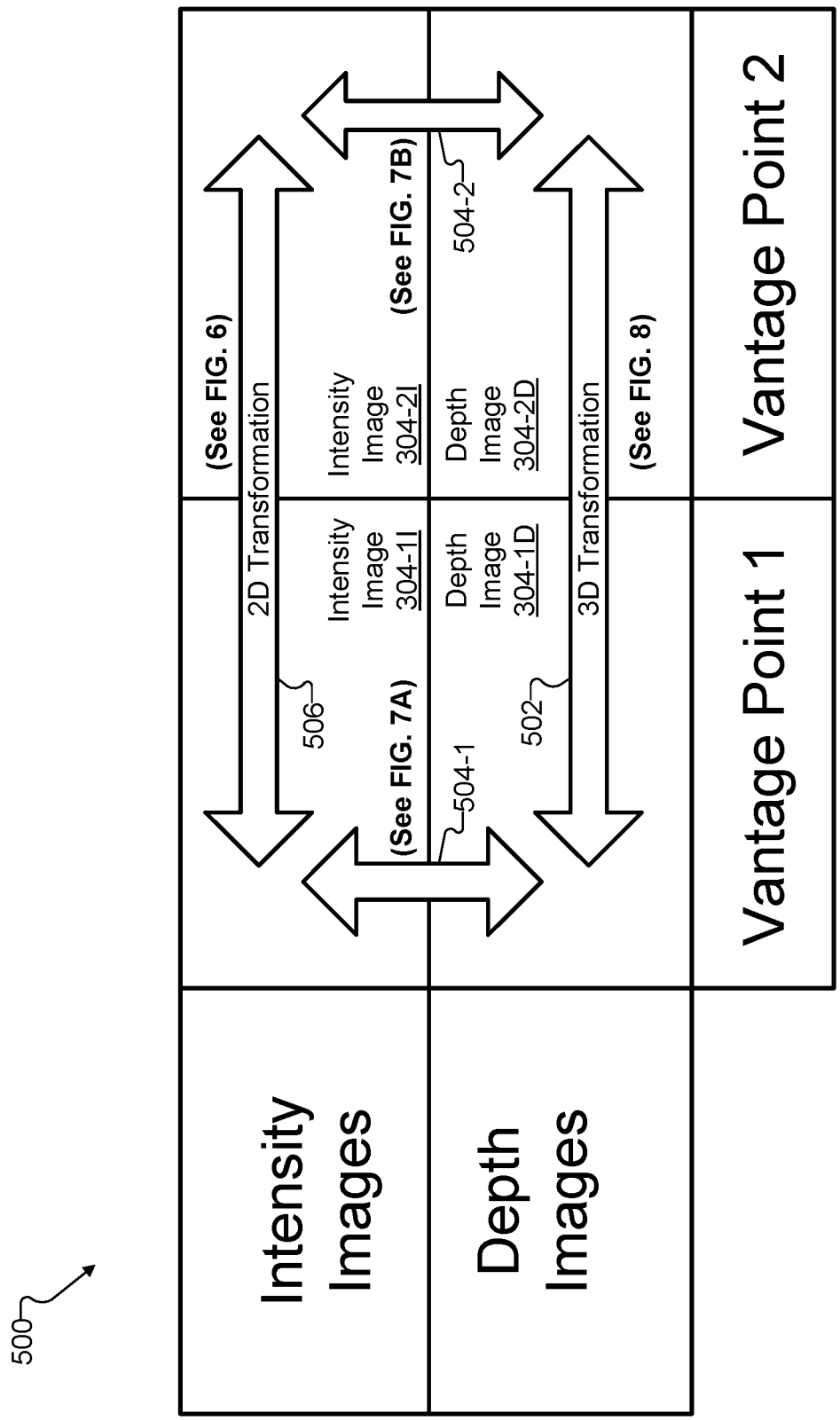
FIG. 5 shows various illustrative transformations between different types of images captured from different vantage points according to embodiments described herein.

To illustrate how these 2D and 3D alignments may be achieved, FIG. 5 shows various illustrative transformations between different types of images captured from different vantage points in accordance with principles described herein. Specifically, FIG. 5 shows a transformation chart 500 that illustrates two different vantage points along a horizontal axis ("Vantage Point 1" and "Vantage Point 2"), two different types of images along a vertical axis ("Intensity Images" and "Depth Images"), and various transformations 502, 504-1, 504-2, and 506 between different images represented in the chart. Each of the boxes in transformation chart 500 may be understood to represent a particular image. Specifically, as shown in the example of FIG. 5, the intensity image captured from vantage point 1 may be intensity image 304-1I, the intensity image captured from vantage point 2 may be intensity image 304-2I, the depth image captured from vantage point 1 may be depth image 304-1D, and the depth image captured from vantage point 2 may be depth image 304-2D.

As will be described in more detail below, methods and systems described herein may allow a 3D transformation 502 between depth images 304-1D and 304-2D to be determined, adjusted, and optimized based on several other transformations that may be more straightforward to reliably determine using established techniques. For example, respective transformations 504 (e.g., transformations 504-1 and 504-2) are shown to go between depth and intensity images captured from a same vantage point (e.g., transformation 504-1 describes the relationship between intensity image 304-1I and depth image 304-1D, while transformation 504-2 describes the relationship between intensity image 304-2I and depth image 304-2D). 2D transformation 506 describes a relationship between intensity images 304-1I and 304-2I, which, as with depth images 304-1D and 304-2D, are captured from different vantage points. However, in contrast to 3D transformation 502, 2D transformation 506 may be relatively straightforward to determine because it relies only on 2D feature pairs, which are generally far more straightforward to reliably identify than 3D feature pairs. Established techniques for reliably and efficiently identifying such 2D feature pairs may be employed by system 100 to identify 2D transformation 506.

When a 3D alignment is generated using depth data captured from multiple vantage points, a distinct depth representation (e.g., a depth image, a point cloud, etc.) may be available for each of the vantage points. Accordingly, a registration process to align each of these depth representations may be performed in a pair-wise manner. That is, pairs of two depth images may be aligned in a chain of 3D alignments such that transformations may be traversed from any given depth image back through to other depth images and ultimately to general world coordinates associated with the scene and configured to serve all of the depth images. 3D transformation 502 illustrates one such transformation between depth images captured at two different vantage points (e.g., the vantage points of surface data capture devices 302-1 and 302-2). It will be understood, however, that depth images 304-1D and 304-2D may each have some degree of overlap not only with one another, but also with other depth images captured by neighboring surface data capture devices 302. As 3D transformation 502 and a chain of additional 3D transformations connecting all of the other depth images are generated and maintained in the ways described herein, it may be possible to revert any depth point to the coordinate system associated with any of the surface data capture devices 302 or to a world coordinate system associated with the scene by multiplying different transforms and following the chain.

In order to determine 3D transformation 502 (e.g., using transformations 504 and 506), system 100 may first establish that the surface data capture devices positioned at vantage points 1 and 2 (i.e., surface data capture devices 302-1 and 302-2 in this example) have a neighbor device relationship. As used herein, a first surface data capture device may be determined to be a neighbor device to a second surface data capture device when a large number of feature pairs (e.g., 2D or 3D feature pairs) can be detected between the devices. For example, the neighbor device for any given surface data capture device may be whichever other surface data capture device is determined to share the most 2D feature pairs with the given surface data capture device. As another example, each particular device may be determined to have a plurality of neighbor devices (e.g. 2 or more neighbor devices) determined as the plurality of surface data capture devices that have the most common 2D features (e.g., the most 2D feature pairs) with the particular device.

As illustrated in FIG. 4, scene 402 may be captured by a plurality of surface data capture devices 302 that includes surface data capture devices 302-1, 302-2, and one or more additional surface data capture devices 302 that capture additional intensity images and depth images from one or more additional vantage points (e.g., surface data capture devices 302-3 through 302-8). Accordingly, system 100 may identify, from among the plurality of all the surface data capture devices 302 and based on various sets of 2D feature pairs determined between different surface data capture devices 302, surface data capture device 302-2 as a neighbor device for surface data capture device 302-1. In response to the identifying of surface data capture device 302-2 as the neighbor device for surface data capture device 302-1, system 100 may determine 3D transformation 502 between the depth images 304-1D and 304-2D, which, as will be described in more detail below, may be used in the selecting of the subset of selected 3D feature pairs.

By reliably establishing neighbor devices in the ways described herein (e.g., by relying first on intensity data and employing a panorama alignment approach for capture device positioning, then relying on a combination of intensity and depth data to determine transformation equations), system 100 may generate a stable and accurate alignment that may lead to reliable and accurate calibration parameters, volumetric models, and so forth. For example, while identifying neighboring relationships may be a difficult and complicated task for 3D objects, well-established techniques for identifying 2D feature pairs (e.g., used for 2D panoramic image creation, etc.) are available such that 2D transformation 506 may be reliably established using such techniques. Because correspondence is already established for surface data capture devices that capture intensity and depth images from a same vantage point, neighbor devices may be identified using these same transformations and system 100 may generate a panoramic 360° representation of an object 404 while detecting neighboring views by using 2D data and panorama stitching principles.

Figure 6:
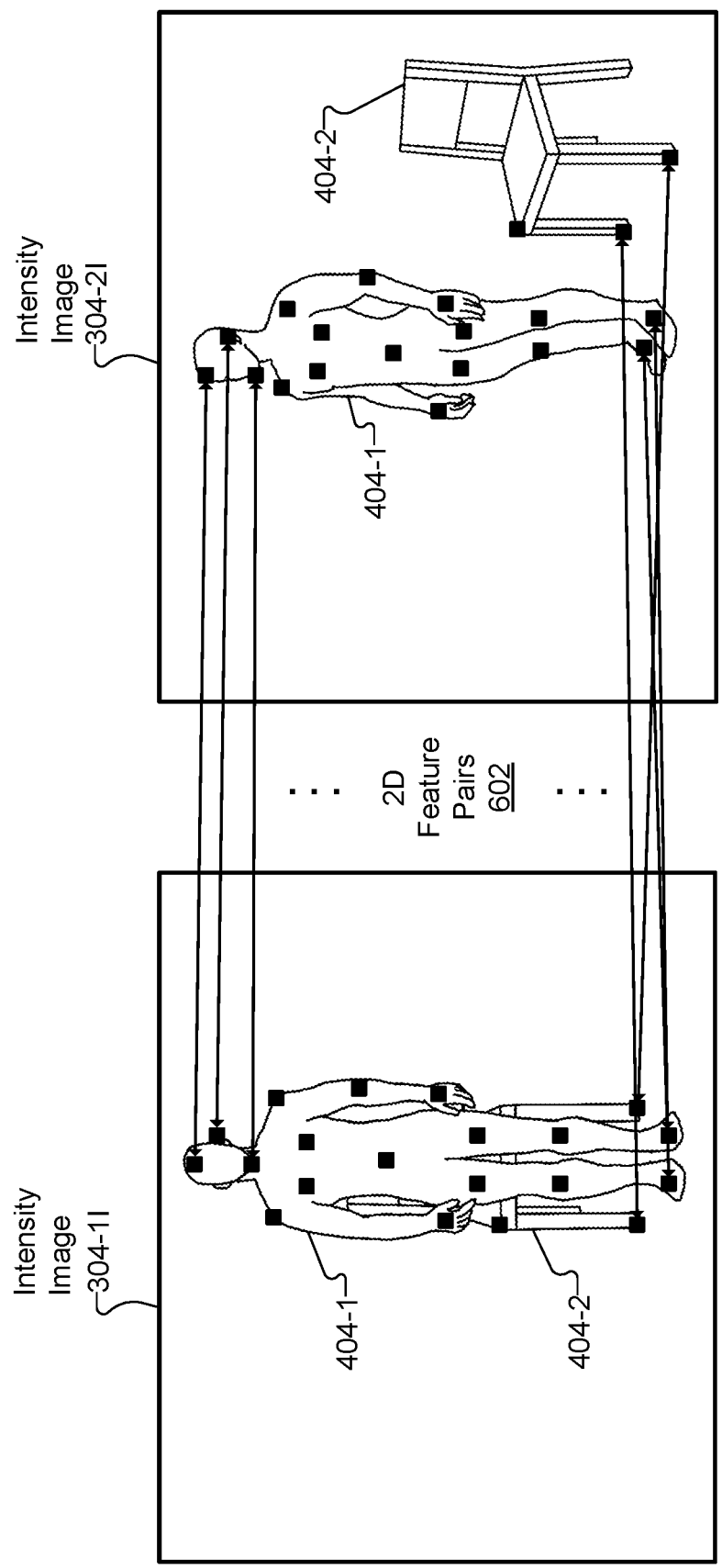
FIGS. 6-8 show various types of feature pairs that may be used to implement the transformations of FIG. 5 and to thereby facilitate calibration of surface data capture devices according to principles described herein.
Figure 7A:
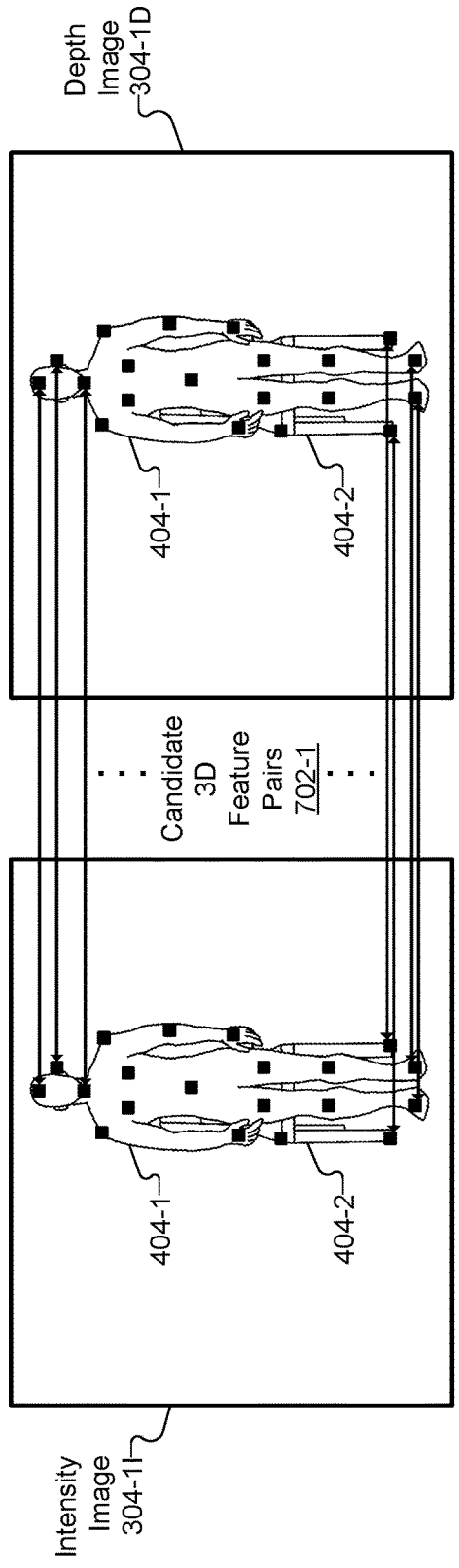
Figure 7B:
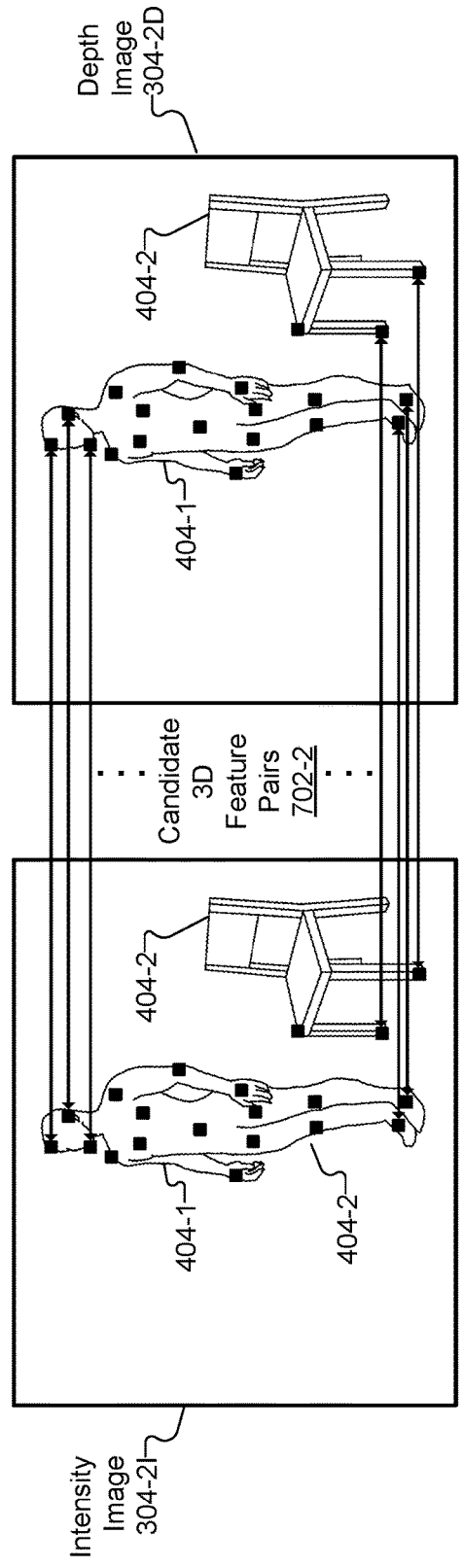
Figure 8:
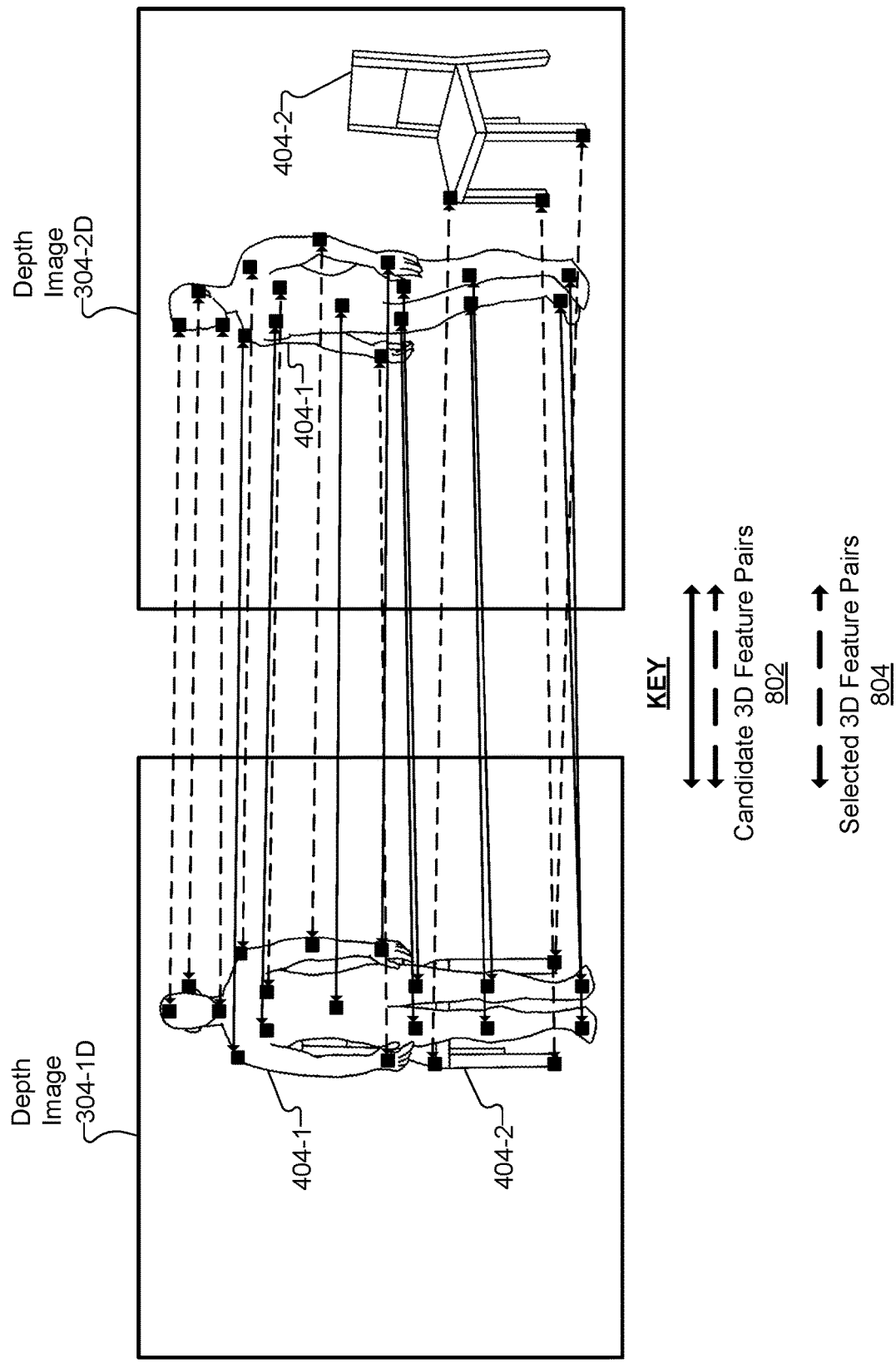

Once a neighbor device has been established for a particular surface data capture device (e.g., once surface data capture device 302-2 is established as a neighbor device for surface data capture device 302-1), transformations 502-506 may be established in any of the ways described herein. To illustrate, as notated in FIG. 5, FIG. 6 shows 2D feature pairs that may be used to implement transformation 506, FIG. 7A shows feature pairs that may be used to implement transformation 504-1, FIG. 7B shows feature pairs that may be used to implement transformation 504-2, and FIG. 8 shows feature pairs that may be used to implement transformation 502. Each of these figures will now be described in more detail.

FIG. 6 shows intensity images 304-1I and 304-2I from the different vantage points of surface data capture devices 302-1 and 302-2, respectively. Both intensity images 304 shown in FIG. 6 depict both objects 404 (i.e., human body object 404-1 and furniture object 404-2), but these objects are depicted from different perspectives in accordance with the different vantage points of the surface data capture devices 302 capturing the intensity images.

Various black squares are shown to be overlaid on each of intensity images 304 in FIG. 6. These black squares will be understood to indicate certain features of objects 404 and/or scene 402 (e.g., identifiable body parts of human body object 404-1, identifiable corners of furniture object 404-2, etc.), rather than being part of the images themselves. A set of 2D feature pairs 602 is illustrated by arrows extending between corresponding features in intensity images 304-1I and 304-2I. For example, a first 2D feature pair 602 (the top arrow in FIG. 6) extends between a forehead feature that is visible on human body object 404-1 in both intensity images 304, a second 2D feature pair 602 (the second to top arrow in FIG. 6) extends between a left ear feature that is visible on human body object 404-1 in both intensity images 304, and so forth. System 100 may determine the set of 2D feature pairs 602 such that each 2D feature pair 602 represent a respective correspondence between a particular feature depicted in intensity image 304-1I (which depicts scene 402 from vantage point 1) and a corresponding feature depicted in intensity image 304-2I (which depicts scene 402 from vantage point 2).

To reduce clutter, only a few 2D feature pairs 602 are explicitly drawn with arrows in FIG. 6. However, it is noted that each feature (i.e., each black square) illustrated in one of intensity images 304 in FIG. 6 is part of a 2D feature pair 602 such that a corresponding feature is illustrated in the other intensity image 304 (even if an arrow may not explicitly extend between the corresponding features in many examples). Accordingly, it will be recognized that various features that may be clearly visible in one intensity image 304 captured from one vantage point, but that are not clearly visible in the other intensity image 304 captured from the other vantage point, may not be part of a 2D feature pair 602 because a 2D feature pair must include corresponding features identified in both intensity images 304. As one example, identifiable corners on the back of furniture object 404-2 are readily identifiable from the vantage point of intensity image 304-2I but are not part of 2D feature pairs 602 because the corresponding corner features are not clearly visible or identifiable from the vantage point of intensity image 304-1I.

System 100 may determine the set of 2D feature pairs 602 in any suitable way. For example, various established feature detection algorithms developed for 2D image stitching and other related tasks may suitably identify features and correspondences between intensity images captured from different vantage points such as intensity images 304-1I and 304-2I. In certain examples, the determining of the set of 2D feature pairs 602 may be performed using an established or custom 2D feature detection algorithm. For example, the 2D feature detection algorithm selected to be employed may be a Speeded-Up Robust Features (SURF) 2D feature detection algorithm due to this algorithm's invariance to scale and rotation in the image plane, its robustness to noise and object overlap, and its performance in the face of changes in brightness and contrast. In other examples, other suitable 2D feature detection algorithms may be employed due to desirable characteristics and performance abilities that the other algorithms may have. For instance, a Histogram of Oriented Gradients (HOG) algorithm, a Gradient Location and Orientation Histogram (GLOH) algorithm, a Scale-Invariant Feature Transform (SIFT) algorithm, a Features from Accelerated Segment Test (FAST) algorithm, a KAZE or Accelerated KAZE (AKAZE) algorithm, or any other suitable 2D feature detection algorithm or combination of these or other suitable algorithms may be employed in certain implementations.

Regardless of the 2D feature detection algorithm employed, system 100 may use a relatively low confidence threshold during the determining of the set of 2D feature pairs 602. In this way, a large number of 2D feature pairs 602 may be identified to form a large pool of candidates for 3D feature pairs, as will be described in more detail below. By having many candidates to choose from, system 100 may be more likely to find optimal 3D feature pairs and may iteratively achieve accurate 3D transformations in later stages of the process, thereby allowing for the production of highly accurate calibration parameters, volumetric models, and so forth.

FIG. 7A shows intensity image 304-1I and depth image 304-1D as captured from vantage point 1 (i.e., as captured from the vantage point of surface data capture device 302-1), while FIG. 7B shows intensity image 304-2I and depth image 304-2D as captured from vantage point 2 (i.e., as captured from the vantage point of surface data capture device 302-2). While respective depth images are presented as being identical to their corresponding intensity images for illustrative clarity in FIGS. 7A and 7B (as well as in other illustrations included herein), it will be understood that depth images represent different aspects and characteristics of depicted objects than are represented by intensity images and do so using a different type of data (e.g., depth data rather than intensity data). As such, depth images may, in some examples, appear very different from corresponding intensity images (although there may still be various similarities as well). All of the intensity and depth images 304 shown in both FIGS. 7A and 7B are shown to depict both objects 404 (i.e., human body object 404-1 and furniture object 404-2), though these objects will be understood to be depicted using different types of data and/or from different vantage points.

As in FIG. 6 described above, various black squares are shown in FIGS. 7A and 7B to be overlaid on each of intensity and depth images 304 to indicate identified features of objects 404 and/or scene 402. A set of candidate 3D feature pairs 702-1 is illustrated in FIG. 7A by arrows extending between corresponding features in intensity image 304-1I and depth image 304-1D, while a set of candidate 3D feature pairs 702-2 is illustrated in FIG. 7B by arrows extending between corresponding features in intensity image 304-2I and depth image 304-2D. The arrows illustrating candidate 3D feature pairs 702-1 and 702-2 are similar to those described above in relation to FIG. 6, and, as described above, explicitly illustrate only a few of the feature pairs while other black squares not explicitly connected by arrows will be understood to represent additional feature pairs.

System 100 may determine the sets of candidate 3D feature pairs 702 (e.g., candidate 3D feature pairs 702-1 and 702-2) in any suitable way to represent at least some of the respective correspondences of 2D feature pairs 602 within depth images 304-1D and 304-2D that depict the scene from the same vantage points as the corresponding intensity images. For example, because of the alignment that corresponding intensity and depth images 304 have by nature of being captured by the same surface data capture device at the same vantage point, identifying correspondences may be straightforward. Specifically, for any feature detected within one of intensity images 304-1I or 304-2I, a corresponding feature within one of intensity images 304-1D or 304-2D may be readily identified at the same place in the depth image as in the intensity image.

FIG. 8 shows depth images 304-1D and 304-2D from the different vantage points of surface data capture devices 302-1 and 302-2. As with intensity and depth images 304 illustrated in FIGS. 6-7B, the depth images 304 shown in FIG. 8 each depict both human body object 404-1 and furniture object 404-2, but depict the objects 404 from different perspectives in accordance with the different vantage points of the surface data capture devices 302 capturing the depth images.

As in FIGS. 6-7B above, various black squares are shown to be overlaid on each of depth images 304 in FIG. 8, and these black squares will be understood to indicate various identified features of objects 404 and/or scene 402. As indicated by the Key near the bottom of FIG. 8, a set of candidate 3D feature pairs 802 is illustrated by solid and dashed arrows extending between corresponding features in depth images 304-1D and 304-2D. The set of candidate 3D feature pairs 802 may be associated with transformation 502 and may be determined based on the set of 2D feature pairs 602 as well as the sets of candidate 3D feature pairs 702-1 and 702-2. Specifically, using the correspondences between vantage points determined using the intensity data (2D feature pairs 602) and the correspondences between intensity and depth data determined based on alignment to the same vantage points (candidate 3D feature pairs 702-1 and 702-2), system 100 may determine the set of candidate 3D feature pairs 802 between depth images 304-1D and 304-2D captured from different vantage points. This is beneficial because 2D feature detection algorithms such as SURF and/or other algorithms described above may not be configured to reliably operate on 3D features (e.g., features of depth data rather than intensity data), making it difficult or impossible for system 100 to accurately and reliably identify a good set of candidate 3D feature pairs 802 directly based on depth images 304-1D and 304-2D alone (without relying on the other feature pairs 602 and 702 described above).

Once the set of candidate 3D feature pairs 802 is identified, system 100 may iteratively cull the set of candidate 3D feature pairs 802 based on error metrics determined for transformation 502. In this manner, system 100 may select only the highest quality 3D feature pairs (e.g., the 3D feature pairs associated with the most confidence or the lowest error metrics). For example, system 100 may select from the set of candidate 3D feature pairs 802, a subset of selected 3D feature pairs 804 that, as indicated by the Key in FIG. 8, include only those feature pairs illustrated with dashed arrows (and not the feature pairs illustrated with solid arrows, as these may be associated with higher error metrics and/or lower confidence).

The subset of selected 3D feature pairs 804 may be selected to minimize an error associated with a transformation between depth image 304-1D and depth image 304-2D (e.g., transformation 502). This selection may be performed in any suitable way. For example, the selecting of the subset of selected 3D feature pairs 804 may be performed using a 3D descriptor to test each candidate 3D feature pair 802 and rate or rank the feature pairs to determine respective confidence values for each feature pair (e.g., to determine which feature pairs are most likely to be accurate). In some examples, a Signature of Histograms of Orientations (SHOT) 3D descriptor may be employed for this purpose. In other examples, advantages of other established or custom 3D descriptors may make it desirable to use these instead of, or in combination with, the SHOT 3D descriptor. For example, other established 3D descriptors that may be employed include, a Point Features Histogram (PFH) 3D descriptor, a Rotation-Invariant Feature Transformation (RIFT) 3D descriptor, a Radius-based Surface Descriptor (RSD) 3D descriptor, and other suitable 3D descriptors that may be used individually or in combination with one another to help filter the overall set of candidate 3D feature pairs 802 to form the set of selected 3D feature pairs 804. Using these algorithms, hundreds of questionable-quality candidate 3D feature pairs may be filtered to a set of, for example, 20-30 high-quality selected 3D feature pairs that reliably define transformation 502.

It has been discovered that, for certain use cases, an optimal combination of the 2D feature detection algorithm and the 3D descriptor may be a SURF-SHOT combination. However, it will be understood that other combinations of the 2D feature detection algorithm and the 3D descriptor may be as or more optimal than the SURF-SHOT combination for various other uses cases and/or other circumstances. In some implementations, system 100 may be capable of operating using various combinations of 2D feature detection algorithms and 3D descriptors, and may be configured to automatically determine an optimal combination to use for a particular use case or situation. For instance, system 100 may use a machine learning technology or other suitable technology to select the 2D feature detection algorithm and/or the 3D descriptor to be employed for a particular scene.

Figure 9:
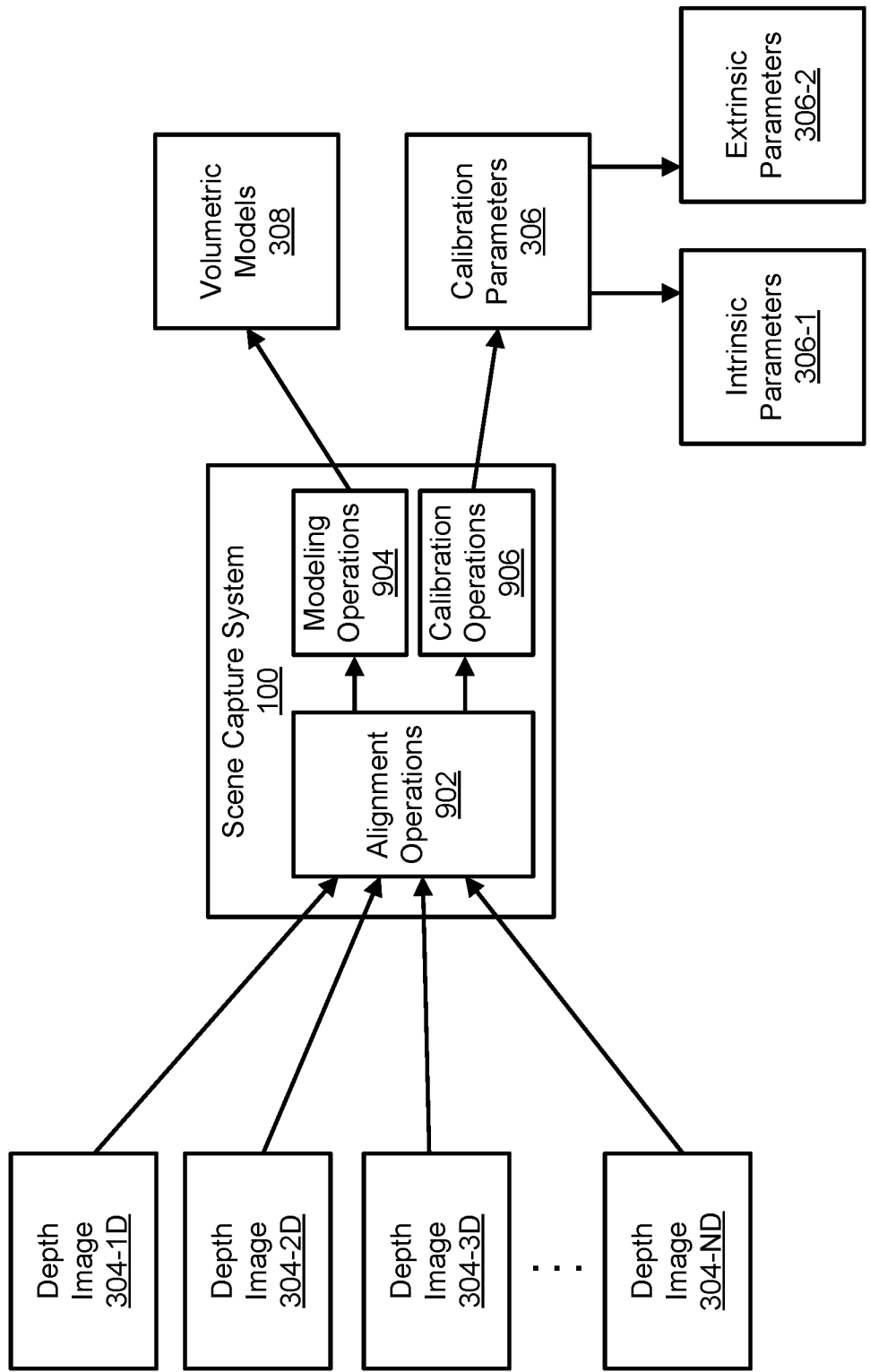
FIG. 9 shows various illustrative functions that a scene capture system may perform based on captured depth images according to embodiments described herein.

FIG. 9 shows various illustrative functions that a scene capture system such as system 100 may perform based on captured depth images in accordance with principles described herein. For example, the representation illustrated by FIG. 9 has some overlap with configuration 300 of FIG. 3 described above, but places more focus on the functionality performed by system 100 (referring to principles that have now been described in relation to FIGS. 4-8) and less focus on the context in which system 100 is operating.

As shown, FIG. 9 depicts depth images 304-1D through 304-ND being introduced as inputs to system 100, and, in particular, as inputs to a set of alignment operations 902 that system 100 is configured to perform. Once alignment operations 902 have been performed, a set of modeling operations 904 is shown to be performed, based on the output of alignment operations 902, to generate and manage volumetric models 308. Additionally, a set of calibration operations 906 is also shown to be performed based on data output from alignment operations 902. Calibration operations 906 are shown to generate and manage calibration parameters 306, which may include either or both intrinsic parameters 306-1 and extrinsic parameters 306-2. Each of the elements of FIG. 9 will now be described in more detail.

Alignment operations 902 may be based on surface data images 304 and, as shown in FIG. 9, depth images 304-1D through 304-ND in particular (where N will be understood to be the number of surface data capture devices 302 being used to capture a particular scene). Alignment operations 902 may be configured to determine and use transformations such as 3D transformation 502 to build and iteratively refine a panoramic 360° view of objects represented by the input depth images by aligning the depth images into a single depth representation associated with a world coordinate system. To accomplish this alignment, alignment operations 902 may involve identifying a relationship (e.g., a geometric relationship) between pairs of vantage points (e.g., vantage points of neighboring surface data capture devices determined as described above). For example, alignment operations 902 may involve identifying a relationship (e.g., a 3D transformation) for vantage points 1 and 2 of surface data capture devices 302-1 and 302-2 respectively (as represented by 3D transformation 502). Alignment operations 902 may further include operations for aligning pairs of depth images (e.g., neighboring pairs of depth images such as depth images 304-1D and 304-2D, etc.) based on the relationship that is identified between the respective vantage points, as well as the subset of selected 3D feature pairs (e.g., selected 3D feature pairs 804).

While examples illustrated above have focused on alignment operations for a single pair of surface data images (e.g., surface data images 304-1 and 304-2), alignment operations 902 may be configured not only to align pairs of surface data images in these ways, but also to progressively align surface data images from a larger number of surface data capture devices into one integrated representation (e.g., one panoramic model that stitches together all of the surface data images). For example, for a scene such as scene 402 that is captured by a plurality of surface data capture devices 302-1 to 302-N (where N=8 in the example shown in FIG. 4) that each capture intensity images and depth images from different vantage points, alignment operations 902 may involve selecting various subsets of selected 3D feature pairs in any of the ways described herein. For example, besides selecting the subset of selected 3D feature pairs 804 for depth images 304-1D and 304-2D as shown in FIG. 8, system 100 may additionally select one or more additional subsets of selected 3D feature pairs associated with additional transformations between other pairs of depth images 304 captured by the plurality of surface data capture devices 302. Based on all of these subsets of selected 3D feature pairs, alignment operations 902 may align all of depth images 304-1D through 304-ND to form a merged depth representation of scene 402.

Modeling operations 904 may be performed based on the merged depth representation of scene 402, as well as based on intensity images (e.g., color data, texture data, etc., that is included within intensity images 304-1I, 304-2I, etc.) that have also been captured by surface data capture devices 302 but is not explicitly shown in FIG. 9. At modeling operations 904, system 100 may generate one or more volumetric models 308 of one or more objects present at the scene. For example, a volumetric model 308 of human body object 404-1 may be generated based on a merged depth representation of scene 402 that includes human body object 404-1. Similarly, a volumetric model 308 of furniture object 404-2 may be generated based on a merged depth representation of scene 402 that includes furniture body object 404-2. In certain examples, these merged depth representations may be the same depth representation (e.g., when both objects are present at scene 402). In other examples, the merged depth representations may be different to reflect whatever objects are present at scene 402 at a particular moment in time.

Calibration operations 906 may also be performed based on the merged depth representation of scene 402. For example, calibration operations 906 may include generating or adjusting calibration parameters 306 based on aligned depth images and/or based on the entire merged depth representation generated by alignment operations 902.

In some examples, surface data capture devices may be adjusted or moved during capture of a particular scene, thereby changing the calibration for at least the capture devices that have been changed and possibly for other capture devices as well. To address the potential dynamic nature of surface data capture devices capturing a particular scene, as well as the dynamic nature of the scene itself as objects move from place to place and so forth, system 100 may continuously reevaluate and track which surface data capture devices neighbor which. Additionally, system 100 may continuously and iteratively update and adjust the 2D and 3D transformations used to describe the relationship between surface data images and/or vantage points to try to ensure that the transformations are as accurate, optimized, and up-to-date as possible.

For example, at calibration operations 906 (or as part of alignment operation 902 in certain examples), system 100 may update an identified relationship (e.g., geometric relationship) between two particular vantage points (e.g., the respective vantage points of surface data capture devices 302-1 and 302-2) subsequent to a movement of at least one of the surface data capture devices that causes a change to the identified relationship. As such, the managing of calibration parameters 306 performed by calibration operations 906 may involve realigning the relevant depth images (e.g., depth images 304-1D and 304-2D in this example) based on the update to the identified relationship between the vantage points and based on the appropriate subset of selected 3D feature pairs (e.g., the subset of selected 3D feature pairs 804 in this example). System 100 may then adjust calibration parameters 306 based on the realigned depth images.

Calibration parameters 306 may include any suitable types of calibration parameters that may facilitate defining the behavior and properties of surface data capture devices in a particular implementation. For example, as shown in FIG. 9, calibration parameters 306 may include at least intrinsic parameters 306-1 and/or extrinsic parameters 306-2.

Intrinsic parameters 306-1 included within calibration parameters 306 may be indicative of internal characteristics of surface data capture devices 302. For instance, intrinsic parameters may indicate focal length, skew, distortion, image center, and so forth, for each surface data capture device 302 so as to help mitigate or correct for lens distortion and/or other unwanted artifacts of image capture. Conversely, extrinsic parameters 306-2 within calibration parameters 306 may be indicative of respective positions and/or orientations of surface data capture devices 302 with respect to a 3D coordinate space associated with scene 402. For instance, extrinsic parameters may define the scene alignment for surface data capture devices 302 to ensure that each surface data capture device 302 shares a common world coordinate space and that the same features captured by different surface data capture devices are properly paired up and aligned in the world coordinate space.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
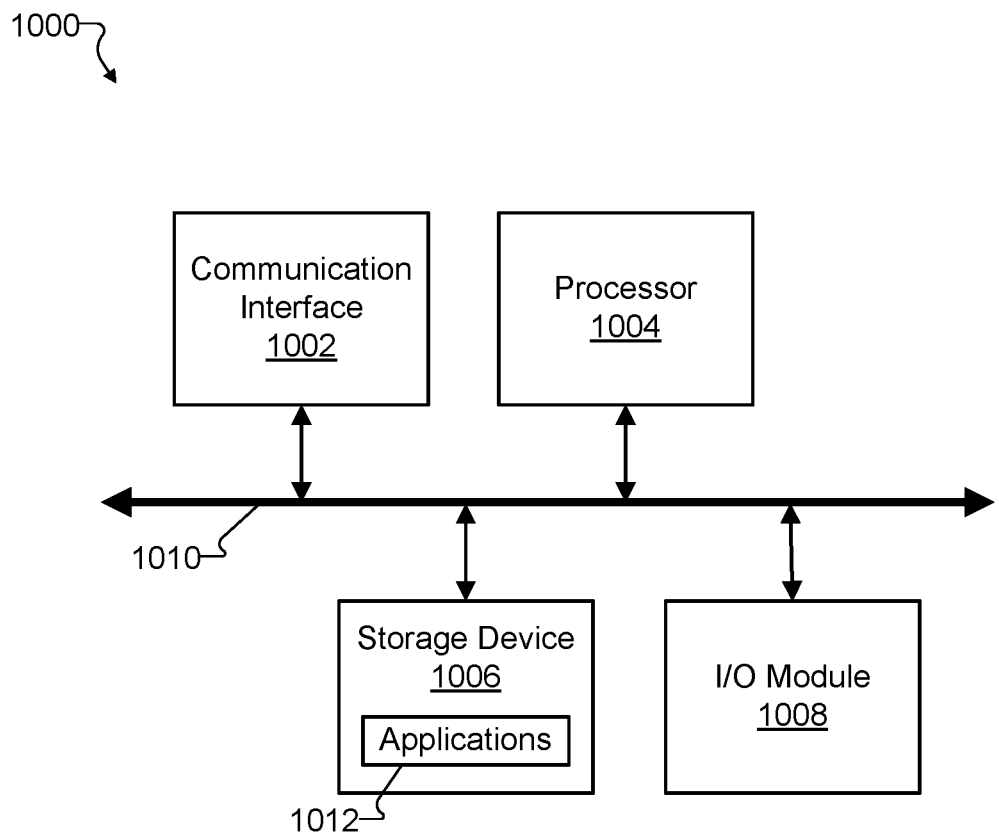
FIG. 10 shows an illustrative computing device according to embodiments described herein.

FIG. 10 shows an illustrative computing device 1000 that may be specifically configured to perform one or more of the processes described herein. For example, computing system 1000 may include or implement (or partially implement) a scene capture system such as system 100 or any component included therein or system associated therewith. In some examples, computing system 1000 may include or implement an image capture system such as described in relation to FIGS. 3 and 4, control or communications elements of certain surface data capture devices 302, a media player device such as media player device 312, or any other computing systems or devices described herein.

As shown in FIG. 10, computing system 1000 may include a communication interface 1002, a processor 1004, a storage device 1006, and an input/output (I/O) module 1008 communicatively connected via a communication infrastructure 1010. While an illustrative computing system 1000 is shown in FIG. 10, the components illustrated in FIG. 10 are not intended to be limiting. Additional or alternative components may be used in other embodiments. Components of computing system 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    determining, by a scene capture system, a set of two-dimensional (2D) feature pairs each representing a respective correspondence between a particular feature depicted in a first intensity image depicting a scene from a first vantage point and a corresponding feature depicted in a second intensity image depicting the scene from a second vantage point;
    determining, by the scene capture system based on the set of 2D feature pairs, a set of candidate three-dimensional (3D) feature pairs representing at least some of the respective correspondences within a first depth image depicting the scene from the first vantage point and a second depth image depicting the scene from the second vantage point;
    selecting, by the scene capture system from the set of candidate 3D feature pairs, a subset of selected 3D feature pairs selected to minimize an error associated with a transformation between the first depth image and the second depth image; and
    initializing, by the scene capture system based on the subset of selected 3D feature pairs, both:
        a first set of calibration parameters for a first surface data capture device that captured the first intensity and depth images from the first vantage point, the first set of calibration parameters including a first intrinsic parameter for the first surface data capture device, and
        a second set of calibration parameters for a second surface data capture device that captured the second intensity and depth images from the second vantage point, the second set of calibration parameters including a second intrinsic parameter for the second surface data capture device.

2. The method of claim 1, further comprising:
    accessing, by the scene capture system from the first surface data capture device, a first dataset that represents the first intensity image and the first depth image in a manner that aligns each feature of the first intensity image with a corresponding feature of the first depth image; and
    accessing, by the scene capture system from the second surface data capture device, a second dataset that represents the second intensity image and the second depth image in a manner that aligns each feature of the second intensity image with a corresponding feature of the second depth image;
    wherein the determining of the set of 2D feature pairs is performed based on the accessing of the first dataset and the accessing of the second dataset.

3. The method of claim 1, wherein:
    the scene is captured by a plurality of surface data capture devices that includes the first and second surface data capture devices and one or more additional surface data capture devices that capture additional intensity images and depth images from one or more additional vantage points; and
    the method further comprises:
        identifying, by the scene capture system from among the plurality of surface data capture devices and based on the set of 2D feature pairs, the second surface data capture device as a neighbor device for the first surface data capture device, and
        determining, by the scene capture system and in response to the identifying of the second surface data capture device as the neighbor device for the first surface data capture device, the transformation between the first and second depth images for use in the selecting of the subset of selected 3D feature pairs.

4. The method of claim 1, further comprising:
    identifying, by the scene capture system, a relationship between the first and second vantage points; and
    aligning, by the scene capture system, the first and second depth images based on the identified relationship between the first and second vantage points and the subset of selected 3D feature pairs;
    wherein the initializing of both the first and second sets of calibration parameters is performed based on the aligned first and second depth images.

5. The method of claim 4, further comprising:
    updating, by the scene capture system, the identified relationship between the first and second vantage points subsequent to a movement of at least one of the first or second surface data capture devices to cause a change to the identified relationship;
    realigning, by the scene capture system, the first and second depth images based on the update to the identified relationship between the first and second vantage points and the subset of selected 3D feature pairs; and
    adjusting, by the scene capture system, the first and second sets of calibration parameters based on the realigned first and second depth images.

6. The method of claim 1, wherein:
    the scene is captured by a plurality of surface data capture devices that includes the first and second surface data capture devices and one or more additional surface data capture devices that capture additional intensity images and depth images from one or more additional vantage points;
    the method further comprises selecting one or more additional subsets of selected 3D feature pairs associated with additional transformations between the depth images captured by the plurality of surface data capture devices; and the initializing of both the first and second sets of calibration parameters is further based on the additional subsets of selected 3D feature pairs and the method further comprises managing calibration parameters for each of the plurality of surface data capture devices by:
aligning, based on the subset and the additional subsets of selected 3D feature pairs, the first, second, and additional depth images to form a merged depth representation of the scene, and
initializing or adjusting the calibration parameters based on the merged depth representation.

7. The method of claim 6, further comprising generating, by the scene capture system based on the merged depth representation of the scene, a volumetric model of an object present at the scene.

8. The method of claim 1, wherein:
the first and second intrinsic parameters are indicative of respective internal characteristics of the first and second surface data capture devices; and
the first set of calibration parameters further includes a first extrinsic parameter for the first surface data capture device and the second set of calibration parameters further includes a second extrinsic parameter for the second surface data capture device, the first and second extrinsic parameters indicative of respective positions and orientations of the first and second surface data capture devices with respect to a 3D coordinate space associated with the scene.

9. The method of claim 1, wherein:
the determining of the set of 2D feature pairs is performed using a 2D feature detection algorithm;
the selecting of the subset of selected 3D feature pairs is performed using a 3D descriptor; and
a machine learning technology is used to select the 2D feature detection algorithm and the 3D descriptor to be employed for the scene.

10. The method of claim 9, wherein:
the 2D feature detection algorithm selected to be employed for the scene is a Speeded-Up Robust Features (SURF) 2D feature detection algorithm; and
the 3D descriptor selected to be employed for the scene is a Signature of Histograms of Orientations (SHOT) 3D descriptor.

11. A system comprising:
a memory storing instructions; and
a processor communicatively coupled to the memory and configured to execute the instructions to:
determine a set of two-dimensional (2D) feature pairs each representing a respective correspondence between a particular feature depicted in a first intensity image depicting a scene from a first vantage point and a corresponding feature depicted in a second intensity image depicting the scene from a second vantage point;
determine, based on the set of 2D feature pairs, a set of candidate three-dimensional (3D) feature pairs representing at least some of the respective correspondences within a first depth image depicting the scene from the first vantage point and a second depth image depicting the scene from the second vantage point;
select, from the set of candidate 3D feature pairs, a subset of selected 3D feature pairs selected to minimize an error associated with a transformation between the first depth image and the second depth image; and
initialize, based on the subset of selected 3D feature pairs, both:
a first set of calibration parameters for a first surface data capture device that captured the first intensity and depth images from the first vantage point, the first set of calibration parameters including a first intrinsic parameter for the first surface data capture device, and
a second set of calibration parameters for a second surface data capture device that captured the second intensity and depth images from the second vantage point, the second set of calibration parameters including a second intrinsic parameter for the second surface data capture device.

12. The system of claim 11, wherein:
the processor is further configured to execute the instructions to:
access, from the first surface data capture device, a first dataset that represents the first intensity image and the first depth image in a manner that aligns each feature of the first intensity image with a corresponding feature of the first depth image, and
access, from the second surface data capture device, a second dataset that represents the second intensity image and the second depth image in a manner that aligns each feature of the second intensity image with a corresponding feature of the second depth image; and
the determining of the set of 2D feature pairs is performed based on the accessing of the first dataset and the accessing of the second dataset.

13. The system of claim 11, wherein:
the scene is captured by a plurality of surface data capture devices that includes the first and second surface data capture devices and one or more additional surface data capture devices that capture additional intensity images and depth images from one or more additional vantage points; and
the processor is further configured to execute the instructions to:
identify, from among the plurality of surface data capture devices and based on the set of 2D feature pairs, the second surface data capture device as a neighbor device for the first surface data capture device, and
determine, in response to the identifying of the second surface data capture device as the neighbor device for the first surface data capture device, the transformation between the first and second depth images for use in the selecting of the subset of selected 3D feature pairs.

14. The system of claim 11, wherein:
the processor is further configured to execute the instructions to:
identify a relationship between the first and second vantage points; and
align the first and second depth images based on the identified relationship between the first and second vantage points and the subset of selected 3D feature pairs; and
the initializing of both the first and second sets of calibration parameters is performed based on the aligned first and second depth images.

15. The system of claim 14, wherein the processor is further configured to execute the instructions to:
update the identified relationship between the first and second vantage points subsequent to a movement of at least one of the first or second surface data capture devices to cause a change to the identified relationship;
realign the first and second depth images based on the update to the identified relationship between the first and second vantage points and the subset of selected 3D feature pairs; and
adjust the first and second sets of calibration parameters based on the realigned first and second depth images.

16. The system of claim 11, wherein:
the scene is captured by a plurality of surface data capture devices that includes the first and second surface data capture devices and one or more additional surface data capture devices that capture additional intensity images and depth images from one or more additional vantage points;
the processor is further configured to execute the instructions to select one or more additional subsets of selected 3D feature pairs associated with additional transformations between the depth images captured by the plurality of surface data capture devices; and
the initializing of both the first and second sets of calibration parameters is further based on the additional subsets of selected 3D feature pairs and the processor is further configured to execute the instructions to manage calibration parameters for each of the plurality of surface data capture devices by:
aligning, based on the subset and the additional subsets of selected 3D feature pairs, the first, second, and additional depth images to form a merged depth representation of the scene, and
initializing or adjusting the calibration parameters based on the merged depth representation.

17. The system of claim 16, wherein the processor is further configured to execute the instructions to generate, based on the merged depth representation of the scene, a volumetric model of an object present at the scene.

18. The system of claim 11, wherein:
the first and second intrinsic parameters are indicative of respective internal characteristics of the first and second surface data capture devices; and
the first set of calibration parameters further includes a first extrinsic parameter for the first surface data capture device and the second set of calibration parameters further includes a second extrinsic parameter for the second surface data capture device, the first and second extrinsic parameters indicative of respective positions and orientations of the first and second surface data capture devices with respect to a 3D coordinate space associated with the scene.

19. The system of claim 11, wherein:
the determining of the set of 2D feature pairs is performed using a 2D feature detection algorithm;
the selecting of the subset of selected 3D feature pairs is performed using a 3D descriptor; and
a machine learning technology is used to select the 2D feature detection algorithm and the 3D descriptor to be employed for the scene.

20. A non-transitory computer-readable medium storing instructions that, when executed, direct a processor of a computing device to:
determine a set of two-dimensional (2D) feature pairs each representing a respective correspondence between a particular feature depicted in a first intensity image depicting a scene from a first vantage point and a corresponding feature depicted in a second intensity image depicting the scene from a second vantage point;
determine, based on the set of 2D feature pairs, a set of candidate three-dimensional (3D) feature pairs representing at least some of the respective correspondences within a first depth image depicting the scene from the first vantage point and a second depth image depicting the scene from the second vantage point;
select, from the set of candidate 3D feature pairs, a subset of selected 3D feature pairs selected to minimize an error associated with a transformation between the first depth image and the second depth image; and
initialize, based on the subset of selected 3D feature pairs, both:
a first set of calibration parameters for a first surface data capture device that captured the first intensity and depth images from the first vantage point, the first set of calibration parameters including a first intrinsic parameter for the first surface data capture device, and
a second set of calibration parameters for a second surface data capture device that captured the second intensity and depth images from the second vantage point, the second set of calibration parameters including a second intrinsic parameter for the second surface data capture device.

* * * * *